United States Patent
Jeon et al.

(10) Patent No.: US 9,459,681 B2
(45) Date of Patent: Oct. 4, 2016

(54) METHOD AND APPARATUS TO CONTROL POWER SUPPLY TO NETWORK DEVICE

(71) Applicant: Samsung Electronics Co., Ltd., Suwon-si, Gyeonggi-do (KR)

(72) Inventors: Byung-gil Jeon, Seoul (KR); Eun-sik Jang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 610 days.

(21) Appl. No.: 13/676,393

(22) Filed: Nov. 14, 2012

(65) Prior Publication Data
US 2013/0124897 A1  May 16, 2013

(30) Foreign Application Priority Data

Nov. 14, 2011 (KR) .................. 10-2011-0118513
Mar. 26, 2012 (KR) .................. 10-2012-0030617

(51) Int. Cl.
*G06F 1/00* (2006.01)
*G06F 1/32* (2006.01)
*G06F 1/26* (2006.01)

(52) U.S. Cl.
CPC ........... *G06F 1/3209* (2013.01); *G06F 1/3278* (2013.01); *G06F 1/26* (2013.01); *Y02B 60/126* (2013.01)

(58) Field of Classification Search
CPC .................................. G06F 1/26; G06F 1/32
USPC ........................................ 713/320, 324, 340
See application file for complete search history.

(56) References Cited

U.S. PATENT DOCUMENTS

| | | | |
|---|---|---|---|
| 6,427,182 B1 * | 7/2002 | Sugiura et al. ............... | 710/303 |
| 8,095,812 B2 * | 1/2012 | Cho et al. ..................... | 713/320 |
| 2001/0027531 A1 * | 10/2001 | Nakamura ..................... | 713/300 |
| 2002/0072391 A1 * | 6/2002 | Itoh et al. ..................... | 455/557 |
| 2004/0003307 A1 * | 1/2004 | Tsuji ............................. | 713/310 |
| 2004/0197104 A1 * | 10/2004 | Doo et al. ..................... | 398/164 |
| 2005/0060587 A1 * | 3/2005 | Hwang et al. ................ | 713/300 |
| 2006/0040715 A1 * | 2/2006 | Chen et al. ................... | 455/574 |
| 2007/0113105 A1 * | 5/2007 | Campbell et al. ............ | 713/300 |
| 2008/0048877 A1 * | 2/2008 | Takahashi ..................... | 340/653 |
| 2009/0193157 A1 * | 7/2009 | Chen .............................. | 710/16 |
| 2009/0300395 A1 * | 12/2009 | Chin et al. .................... | 713/324 |

OTHER PUBLICATIONS http://media.digikey.com/pdf/Data%20Sheets/Intel%20PDFs/LXT915.pdf "Multiport Ethernet Repeater", 32 pages, Dec. 20, 2005.*

* cited by examiner

*Primary Examiner* — Phil Nguyen
(74) *Attorney, Agent, or Firm* — Staas & Halsey LLP

(57) ABSTRACT

An apparatus to control power of an electronic device includes a local area network (LAN) controller to control network communication of the electronic device, a communication interface connected to an external dongle to perform the network communication, a connection detector to detect whether a first signal for connection with the LAN controller is received from the external dongle, and a power controller to supply power to the LAN controller when the first signal is detected and to shut off power to the LAN controller when the first signal is not detected.

20 Claims, 5 Drawing Sheets

METHOD AND APPARATUS TO CONTROL POWER SUPPLY TO NETWORK DEVICE

CROSS-REFERENCE TO RELATED APPLICATIONS

This application claims priority under 35 U.S.C. §119 from Korean Patent Application Nos. 10-2011-0118513 and 10-2012-0030617, filed on Nov. 14, 2011 and Mar. 26, 2012, respectively, in the Korean Intellectual Property Office, the disclosures of which are incorporated herein in their entirety by reference.

BACKGROUND OF THE INVENTION

1. Field of the Invention

The present general inventive concept relates to a method and apparatus to control power supply to a network device, and more particularly, to a method and apparatus to control power supplied to a local area network (LAN) controller.

2. Description of the Related Art

Due to miniaturization of electronic devices including a notebook personal computer (PC), or the like, external Ethernet dongles for connecting an electronic device to a wired and wireless network have been developed. An external Ethernet dongle is an external device for facilitating network communication between electronic devices.

A local area network (LAN) device is included in a personal computer (PC) and includes a LAN controller, a LAN transformer, and a LAN port. When all the components of the LAN device are installed in a notebook PC, the size of the notebook PC is increased, and the thickness of the notebook PC is increased due to the LAN port. Thus, only the LAN controller is installed in the notebook PC, and the LAN transformer and the LAN port are installed in the external dongle, and thus the notebook PC may be miniaturized and become slimmer.

SUMMARY OF THE INVENTION

The present general inventive concept provides a method and apparatus to control power supplied to a network device and to shut off power to a local area network (LAN) controller in a case where an external dongle is not connected, thereby preventing power from being wasted.

The present general inventive concept also provides a method and apparatus to control power to prevent a signal transmitted by a LAN controller from floating, thereby achieving stable impedance matching between the signal transmitted by the LAN controller and a signal transmitted by an external dongle.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an apparatus to control power of an electronic device, the apparatus including a local area network (LAN) controller to control network communication of the electronic device, a communication interface connected to an external dongle to perform the network communication, a connection detector to detect whether a first signal for connection with the LAN controller is received from the external dongle, and a power controller to supply power to the LAN controller when the first signal is detected and to shut off power to the LAN controller when the first signal is not detected.

The LAN controller may transmit a second signal to the external dongle for connection with the external dongle when power is supplied by the power controller.

The second signal may be transmitted after the first signal is received from the external dongle.

The connection detector may transmit a low signal to the power controller when the first signal is detected and transmits a high signal to the power controller when the first signal is not detected.

The power controller may include a metal-oxide-semiconductor field-effect transistor (MOSFET) that is a switching device switched by the low signal or the high signal.

The communication interface may be a medium dependent interface (MDI) port.

The first signal may be an MDI signal.

The foregoing and/or other features and utilities of the present general inventive concept may also be achieved by providing a method of controlling power of an electronic device, the method including detecting whether a first signal for connecting with a LAN controller of the electronic device is received from an external dongle through a communication interface, and supplying power to the LAN controller when the first signal is detected and shutting off power to the LAN controller when the first signal is not detected.

The method may further include transmitting a second signal for connection with the external dongle to the external dongle when power is supplied to the LAN controller, wherein the LAN controller performs the transmitting.

The second signal may be transmitted after the first signal is received from the external dongle.

The method may further include transmitting a low signal to a power controller to supply power to the LAN controller when the first signal is detected, and transmitting a high signal to the power controller to shut off power to the LAN controller when the first signal is not detected.

The shutting-off power may include shutting-off power by using a MOSFET that is a switching device switched by the low signal or the high signal.

The communication interface may be an MDI port.

The first signal may be an MDI signal.

The foregoing and/or other features and utilities of the present general inventive concept may also be achieved by providing a computer readable medium having recorded thereon a program to execute a method of controlling power of an electronic device.

The foregoing and/or other features and utilities of the present general inventive concept may also be achieved by providing an apparatus to control power of an electronic device, the apparatus including a LAN controller to control network communication of the electronic device, a communication interface connected to an external dongle for performing the network communication, a connection detector connected to a connection pin of the communication interface to detect connection of the external dongle with the communication interface, and output a high signal or a low signal, a voltage source connected between the connection pin of the communication interface and the connection detector, and a power controller to shut off power to the LAN controller when the high signal is output and to supply power to the LAN controller when the low signal is output, wherein the connection pin of the communication interface is connected to grounded connection pin among connection pins of the external dongle, wherein the connection detector outputs the high signal when a voltage applied by the voltage source is detected and outputs the low signal if the voltage is not detected.

The foregoing and/or other features and utilities of the present general inventive concept may also be achieved by providing an apparatus to control power of an electronic device, the apparatus including a LAN controller to control network communication of the electronic device, a communication interface connected to an external dongle for performing the network communication, a connection detector to detect whether a link pulse signal for connection with the LAN controller is received from the external dongle, and a power controller to supply power to the LAN controller when the link pulse signal is detected and to shut off power to the LAN controller when the link pulse signal is not detected.

The foregoing and/or other features and utilities of the present general inventive concept may also be achieved by providing an apparatus to control power of an electronic device, the apparatus including a LAN controller to control network communication of the electronic device, a communication interface connected to an external dongle for performing the network communication, a connection detector to detect an impedance change of the communication interface and to determine whether the external dongle is connected to the communication interface, and a power controller to supply power to the LAN controller when the external dongle is connected to the communication interface and to shut off power to the LAN controller when the external dongle is not connected to the communication interface.

The foregoing and/or other features and utilities of the present general inventive concept may also be achieved by providing an apparatus to control power of an electronic device, the apparatus including a local area network (LAN) controller to control network communication of the electronic device, a connection detector to detect a characteristic of a connection between the external dongle and the electronic device, and a power controller to control power to be supplied to the LAN controller according to the detected characteristic.

The characteristic of the connection may be at least one of existence of a signal transmitted from the external dongle to the communication interface, a voltage level of a signal between the external dongle and the communication interface, a link pulse signal for connection with the LAN controller, and a change of an impedance level of the communication interface.

The apparatus may further include a main controller to generate a signal to control the power supplier and the power controller to supply the power to the LAN controller according to the signal to initiate a communication with the dongle after the power controller terminates the power supply to the LAN controller.

The power controller may repeat a power supply operation and a power shut off operation on the LAN controller according to at least one of the detected characteristic and a communication initiation signal to initiate the network communication.

The LAN controller may be in one of a wake up state and a sleep state according to the power supply.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
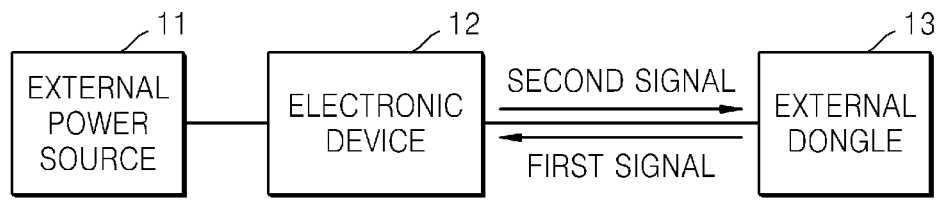
FIG. 1 is a block diagram illustrating a system including an electronic device connected to an external power source and an external dongle according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

As used herein, the term 'unit' refers to components of software or hardware such as a field-programmable gate array (FPGA) or an application specific integrated circuit (ASIC) and a 'unit' performs a particular function. However, the term 'unit' is not limited to software or hardware. A 'unit' may be configured to be included in a storage medium to be addressed or to reproduce one or more processors. Thus, examples of a 'unit' include components such as components of object-oriented software, class components, and task components, processes, functions, attributes, procedures, subroutines, segments of program codes, drives, firmware, a microcode, circuit, data, a database, data structures, tables, arrays, and parameters. Functions provided by components and 'units' may be performed by combining a smaller number of components and 'units' or further separating additional components and 'units' therefrom.

FIG. 1 is a block diagram illustrating a system including an electronic device 12 connected to an external power source 11 and an external dongle 13 according to an embodiment of the present general inventive concept.

Throughout this specification, the electronic device 12 includes any electronic device that is connectable to a wired and wireless network such as a computer, a notebook, a personal assistant, a smart phone, a tablet computer apparatus, an audio and/or video apparatus, an image processing or forming apparatus, or the like.

The electronic device 12 receives power from the external power source 11 and operates. The electronic device 12 may be connected to the external dongle 13 that facilitates network communication through a communication interface (not).

The electronic device 12 may include a secondary power source (not illustrated), for example, a battery unit, to receive power from the external power source 11 and to store the received power in battery cells of the battery unit. In this case, the secondary power source may supply the stored power to components of the electronic device 12 to perform functions thereof.

The electronic device 12 and the external dongle 13 may respectively transmit a second signal and a first signal so as to be connected to each other. The first signal may be generated from the external dongle 13 and transmitted to the electronic device 12, and the second signal may be generated from the electronic device 12 and then transmitted to the external dongle 13.

If power applied from the external power source 11 is continuously supplied to a local area network (LAN) controller (not illustrated) when where the electronic device 12 is not connected to the external dongle 13, power may be wasted. In order to perform stable network communication, the second signal and the first signal that are respectively transmitted from the electronic device 12 and the external dongle 13 so as to connect the electronic device 12 and the external dongle 13 need to be impedance-matched. However, if power is continuously supplied to the LAN controller, the LAN controller continuously transmits the second signal when the LAN controller does not receive the first signal. As a result, the second signal may float and may not be impedance-matched with the first signal. Accordingly, according to an embodiment of the present general inventive concept, when the electronic device 12 is connected to the external dongle 13, the electronic device 12 supplies power to the LAN controller. When the electronic device 12 is not connected to the external dongle 13, the electronic device 12 shuts off power to the LAN controller. This will be described in detail with reference to FIG. 3.

Figure 2:
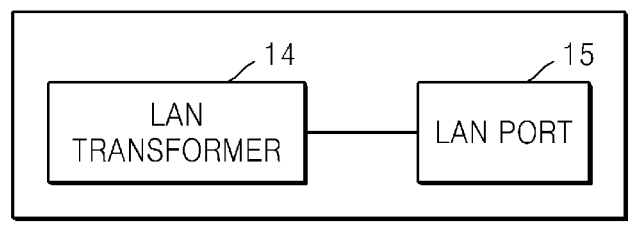
FIG. 2 is a block diagram illustrating an external dongle according to an embodiment of the present general inventive concept.

FIG. 2 is a block diagram illustrating the external dongle 13 of FIG. 1 according to an embodiment of the present general inventive concept.

Referring to FIG. 2, the external dongle 13 includes a LAN transformer 14 and a LAN port 15.

As described above, a LAN controller constituting a LAN card is included in the electronic device 12, and the LAN transformer 14 is included in the external dongle 13.

The LAN transformer 14 converts a LAN signal received through a LAN connector and exchanges the LAN signal with the LAN controller.

The LAN port 15 may be a port to which a LAN connector is connected and may include an RJ-45 port.

Figure 3:
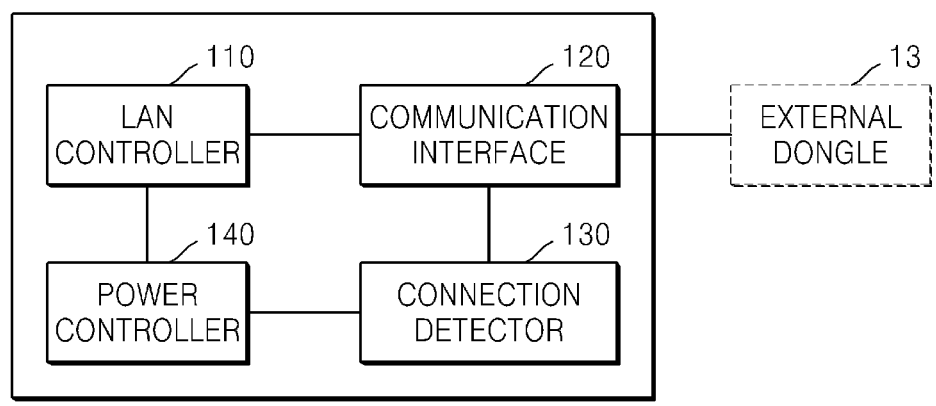
FIG. 3 is a block diagram illustrating a power controlling apparatus according to an embodiment of the present general inventive concept.

FIG. 3 is a block diagram illustrating a power controlling apparatus 100 according to an embodiment of the present general inventive concept.

Referring to FIG. 3, the power controlling apparatus 100 includes a LAN controller 110, a communication interface 120, a connection detector 130, and a power controller 140. The power controlling apparatus 100 may be included in the electronic device 12.

The LAN controller 110 controls network communication of the electronic device 12. The LAN controller 110 may transmit a signal for connection with the external dongle 13 and may be connected to the external dongle 13 to perform network communication.

The communication interface 120 may be connected to the external dongle 13 and may include a medium dependent interface (MDI) port. When the communication interface 120 is an MDI port, a signal transmitted between the LAN controller 110 and the external dongle 13 may include an MDI signal.

The connection detector 130 detects whether the first signal for connection with the LAN controller 110 is received from the external dongle 13.

When the external dongle 13 is connected to the communication interface 120, the external dongle 13 transmits the first signal for connection with the LAN controller 110 through the communication interface 120. The connection detector 130 may determine whether the external dongle 13 is connected to the communication interface 120 by detecting whether the first signal is received from the external dongle 13. When the communication interface 120 is an MDI port, the first signal may be an MDI signal.

The connection detector 130 may also detect whether a link pulse signal is received from the external dongle 13. When the external dongle 13 is connected to the communication interface 120 when a LAN connector is connected to the LAN port 15 of the external dongle 13, the LAN connector periodically transmits the link pulse signal to the communication interface 120. When the LAN controller 110 performs network communication through the external dongle 13, the LAN connector stops transmitting the link pulse signal. Thus, the connection detector 130 may detect the link pulse signal received from the LAN connector through the external dongle 13 and determine whether the external dongle 13 is connected to the communication interface 120.

When the connection detector 130 detects the first signal, the power controller 140 supplies power to the LAN controller 110. When the connection detector 130 does not detect the first signal, the power controller 140 shuts off power to the LAN controller 110. That is, when the external dongle 13 is connected to the communication interface 120, the power controller 140 supplies power to the LAN controller 110. When the external dongle 13 is not connected to the communication interface 120, the power controller 140 shuts off power to the LAN controller 110. When the connection detector 130 detects the link pulse signal and determines that the external dongle 13 is connected to the communication interface 120, the power controller 140 supplies power to the LAN controller 110. When the connection detector 130 does not detect the link pulse signal and determines that the external dongle 13 is not connected to the communication interface 120, the power controller 140 shuts off power to the LAN controller 110.

In the power controlling apparatus 100, the LAN controller 110 transmits the second signal for connection with the external dongle 13 when the power controller 140 supplies power to the LAN controller 110. That is, after the LAN controller 110 receives the first signal or the link pulse signal from the external dongle 13, the LAN controller 110 transmits the second signal to the external dongle 13.

Thus, when the external dongle 13 is not connected to the communication interface 120, the LAN controller 110 is prevented from consuming power. In addition, the LAN controller 110 does not transmit the second signal until the LAN controller 110 is connected to the external dongle 13, thereby maintaining stable impedance matching with the first signal.

Figure 8:
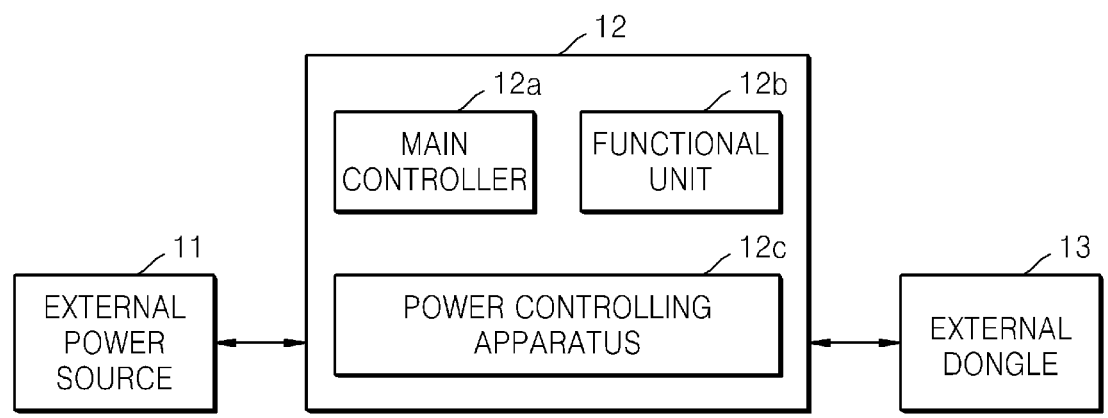
FIG. 8 is a diagram illustrating an electronic device according to an embodiment of the present general inventive concept.

As illustrated in FIG. 8, the electronic device 12 may further include a main controller 12a to control the functions of the electronic apparatus 12. Referring to FIGS. 3 and 8, the main controller 12a may generate a signal to control the LAN controller 110, a signal to initiate a communication between the electronic device 12 and the external dongle 13, or a signal as the second signal to respond to the first signal received from the external dongle 13. The electronic device 12 may further include a functional unit 12b to perform the functions of the electronic device 12 according to data stored in a storage unit of the electronic device 12 or data received from the external dongle 13. The functional unit 12b may have one or more electrical and mechanical components associated with the corresponding functions. The electronic device 12 may further include a power controlling apparatus 12c to control power supply and to supply power to components of the electronic device 12. The power controlling apparatus 12c of FIG. 8 may correspond to the power controlling apparatus 100 of FIG. 3.

Referring back to FIG. 3, the LAN controller 110 may be in a wake up state and a sleep state according to at least one of the power supply of the power controller 140 of FIG. 3 or a signal from the main controller 12a of FIG. 8.

Figure 4:
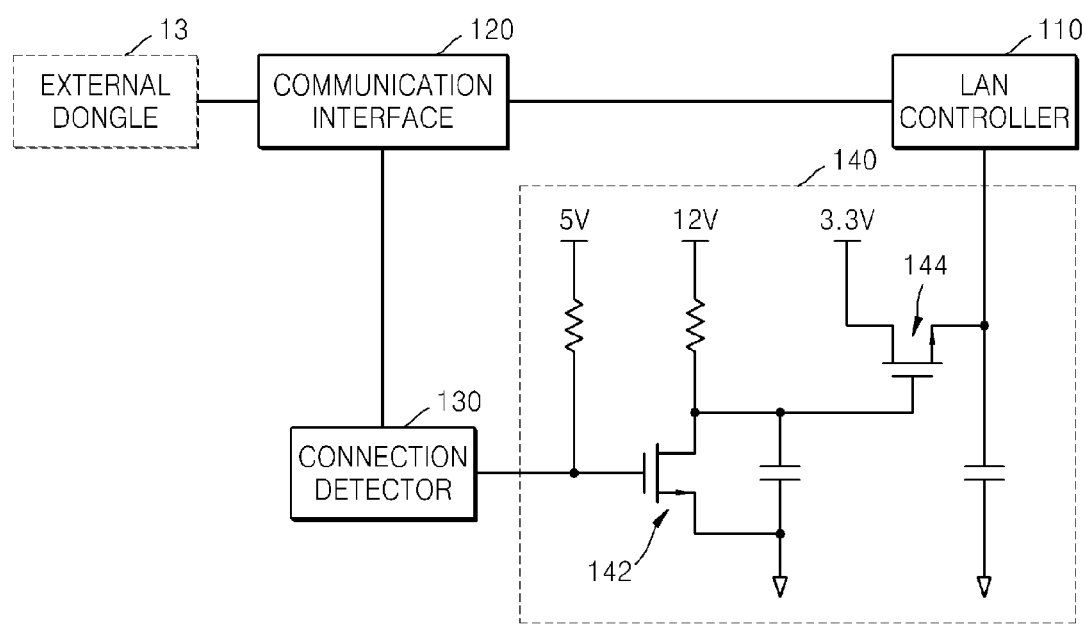
FIG. 4 is a block diagram illustrating a power controlling apparatus according to an embodiment of the present general inventive concept.

FIG. 4 is a block diagram illustrating a power controlling apparatus 200 according to an embodiment of the present general inventive concept. The power controlling apparatus 200 may correspond to the power controlling apparatus 100 of FIG. 3. The power controlling apparatus 200 of FIG. 4 includes a circuit diagram to correspond to the power controller 140 of FIG. 3.

The connection detector 130 detects a characteristic of a connection state or communication state between the electronic device 12 and the external dongle 13, for example, whether a first signal or a link pulse signal is received from the external dongle 13. When the first signal or the link pulse signal is detected, a low signal is transmitted to the power controller 140. When the first signal or the link pulse signal is not detected, a high signal is transmitted to the power controller 140. The low signal is a signal having a predetermined output level. The high signal is a signal having an output level higher than that of the low signal.

When the low signal is received from the connection detector 130, a first switch 142 is opened so that a voltage of 12 V may be connected to a second switch 144 and the second switch 144 may be closed due to the 12 V. The first switch 142 and the second switch 144 may be an N-type metal-oxide-semiconductor field-effect transistor (MOSFET). Thus, a voltage of 3.3 V is applied to the LAN controller 110 through the second switch 144 so that power is supplied to the LAN controller 110.

When the high signal is received from the connection detector 130, the first switch 142 is closed so that an overall current due to a voltage of 12V may flow to ground. Thus, the second switch 144 is opened such that power of 3.3V is prevented from being supplied to the LAN controller 110 through the second switch 144.

Although the N-type MOSFET that is opened when the high signal is applied is illustrated in FIG. 4, the present general inventive concept is not limited thereto. A P-type MOSFET that is opened when the low signal is applied can be used as the first switch 142 and the second switch 144. Thus, in a case where P-type MOSFETs are used as the first switch 142 and the second switch 144, if the connection detector 130 detects the first signal or the link pulse signal, the connection detector 130 may transmit the high signal. If the connection detector 130 does not detect the first signal or the link pulse signal, the connection detector 130 may transmit the low signal.

Figure 5:
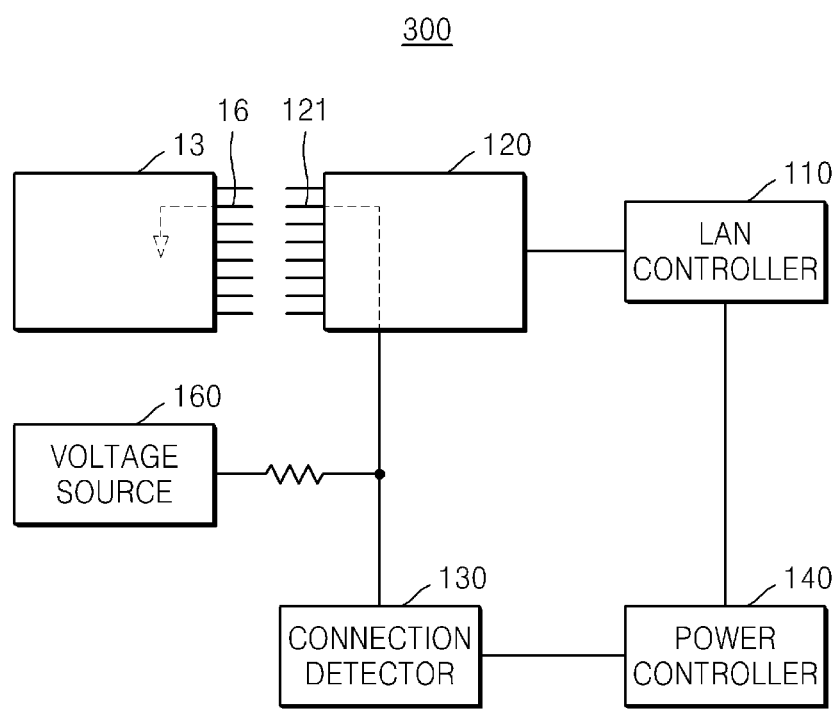
FIG. 5 is a block diagram illustrating a power controlling apparatus according to an embodiment of the present general inventive concept.

FIG. 5 is a block diagram illustrating a power controlling apparatus 300 according to an embodiment of the present general inventive concept.

Referring to FIGS. 3 and 5, the power controlling apparatus 300 may include the LAN controller 110, the communication interface 120, the connection detector 130, the power controller 140, and a voltage source 160.

The communication interface 120 includes a plurality of connection pins that are respectively connected to a plurality of connection pins of the external dongle 13 to transmit and receive data and/or signals to perform the corresponding functions of the external dongle 13 and the electronic device 12.

The connection detector 130 is connected to a connection pin 121 of the communication interface 120 that is connected to a grounded connection pin 16 among the connection pins of the external dongle 13.

Although the connection pin 121 of the communication interface 120 and the connection pin 16 of the external dongle 13 are located as a top second pin among the plurality of connection pins in FIG. 5, this is exemplary, and the present general inventive concept is not limited thereto. The connection pin 121 and the connection pin 16 may have other locations among the plurality of connection pins.

The voltage source 160 is connected between the connection detector 130 and the connection pin 121 of the communication interface 120. The voltage source 160 may be connected in parallel between the connection detector 130 and the connection pin 121 of the communication interface 120.

When the external dongle 13 is not connected to the communication interface 120, the connection detector 130 detects a voltage applied from the voltage source 160. When the external dongle 13 is connected to the communication interface 120, the connection detector 130 detects a voltage applied by the grounded connection pin 16 of the external dongle 13. The connection pin 16 of the external dongle 13 is grounded, and thus the connection detector 130 may detect a voltage of 0 V.

The connection detector 130 outputs a high signal when the connection detector 130 detects the voltage applied by the voltage source 160, and outputs a low signal when the connection detector 130 does not detect the voltage applied by the voltage source 160 or when the connection detector 30 detects a ground potential corresponding to the voltage of the grounded connection pin 16.

The power controller 140 shuts off power to the LAN controller 110 when the connection detector 130 outputs the high signal, and supplies power to the LAN controller 110 if the connection detector 130 outputs the low signal.

In the power controlling apparatus 300 according to an embodiment of the present general inventive concept, the connection detector 130 may detect an impedance change of the communication interface 120 and determine whether the external dongle 13 is connected to the communication interface 120. That is, when the external dongle 13 is not connected to the communication interface 120, the communication interface 120 may have a first impedance value with respect to an MDI signal, and when the external dongle 13 is connected to the communication interface 120, the communication interface 120 may have a second impedance value with respect to the MDI signal. The connection detector 130 may determine whether the external dongle 13 is connected to the communication interface 120 based on a difference between the first impedance value and the second impedance value or based on a impedance change of the communication interface 120.

Figure 6:
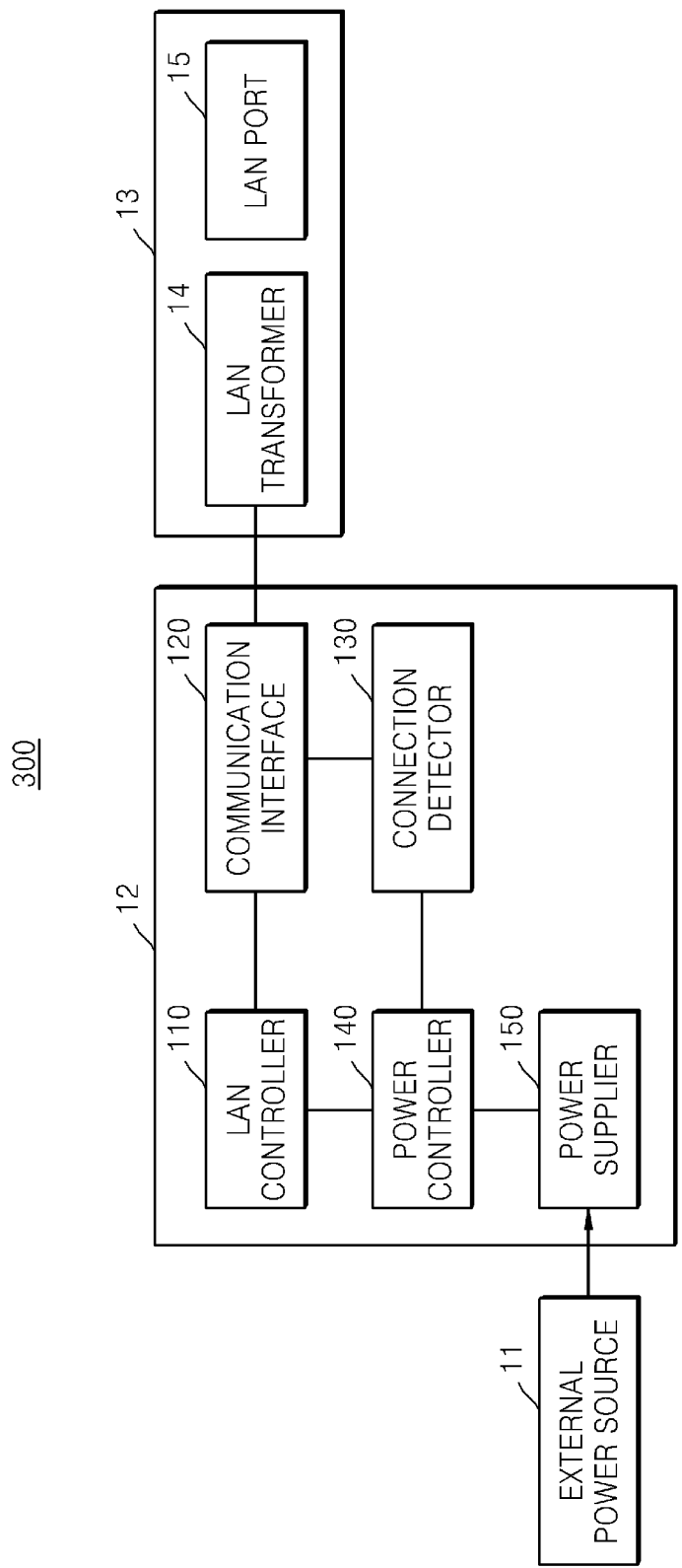
FIG. 6 is a block diagram illustrating a system including an electronic device connected to an external power source and an external dongle according to an embodiment of the present general inventive concept.

FIG. 6 is a block diagram illustrating a system including the electronic device 12 connected to the external power source 11 and the external dongle 13 according to an embodiment of the present general inventive concept.

Power from the external power source 11 is supplied to a power supplier 150 of the electronic device 12. The power supplier 150 supplies power to other components including the LAN controller 110. The power supplier 150 may include a main board of a computer apparatus.

When the connection detector 130 detects a first signal or a link pulse signal received from the external dongle 13 and transmits a low signal to the power controller 140, the power controller 140 may control the power supplier 150 to supply power to the LAN controller 110. When the connection detector 130 does not detect the first signal or the link pulse signal received from the external dongle 13 and transmits a high signal to the power controller 140, the power controller 140 may control the power supplier 150 to shut-off power to the LAN controller 110.

Figure 7:
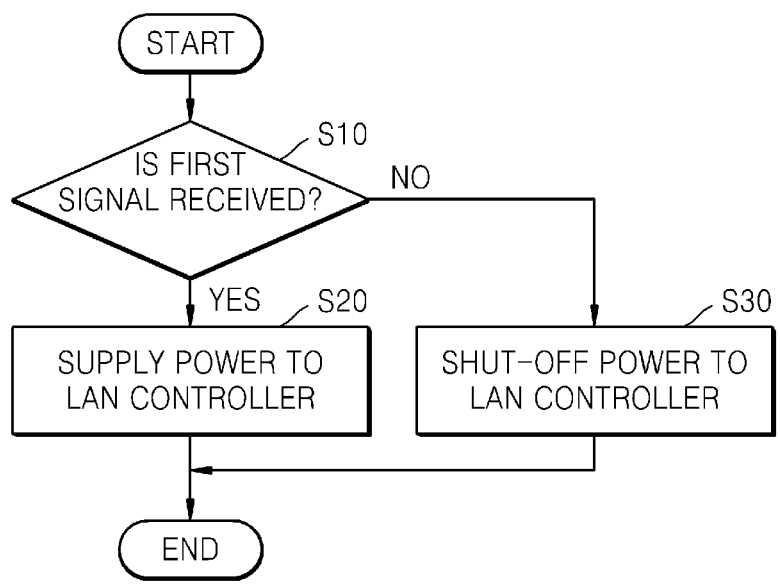
FIG. 7 is a flowchart illustrating a method of controlling power according to an embodiment of the present general inventive concept.

FIG. 7 is a flowchart illustrating a method of controlling power in an electronic device according to an embodiment of the present general inventive concept. Referring to FIG. 7, the method according to an embodiment of the present general inventive concept includes operations that are sequentially performed by each of the power controlling apparatuses 100 and 200 of FIGS. 3 and 4. Thus, although omitted below, the detailed description of the power controlling apparatuses 100 and 200 of FIGS. 3 and 4 may be applied to the method of FIG. 7.

In operation S10, the connection detector 130 detects whether the first signal for connection with the LAN controller 110 is received from the external dongle 13 through the communication interface 120.

If the first signal is detected, the power controller 140 supplies power to the LAN controller 110 in operation S20. If the first signal is not detected, the power controller 140 shuts off power to the LAN controller 110 in operation S30.

As described above, the method and apparatus to control power in an electronic device according to an embodiment of the present general inventive concept shut off power supplied to a LAN controller in a case where an external dongle is not connected, thereby preventing power of a battery from being wasted.

In addition, the method and apparatus to control power according to an embodiment of the present general inventive concept prevent a signal transmitted by the LAN controller from floating, thereby achieving stable impedance matching between the signal transmitted by the LAN controller and a signal transmitted by the external dongle.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to control power of an electronic device, the apparatus comprising:
    a local area network (LAN) controller to control network communication of the electronic device;
    a communication interface connected to the LAN controller,
    wherein
        the communication interface is connectable to an external dongle which performs the network communication with the LAN controller through the external dongle, the external dongle includes a signal transformer which generates a first connection signal and a LAN port connectable to a LAN connector;
    a connection detector to detect, in response to the external dongle connected to the communication interface, the first generated connection signal transmitted by the signal transformer of the external dongle to establish connection with the LAN controller through the communication interface; and
    a power controller to supply power to the LAN controller in response to a detection by the connection detector of the first generated connection signal transmitted by the signal transformer of the external dongle and to shut off power to the LAN controller in response to not detecting by the connection detector the first generated connection signal,
    to thereby by the power controller supply and shut off power to the LAN controller in response to the detection or the not detection by the connection detector of the first generated connection signal transmitted by the signal transformer of the external dongle,
    wherein the connection detector transmits a low signal to the power controller when the first generated connection signal transmitted by the signal transformer of the external dongle is detected by the connection detector and transmits a high signal to the power controller when the first generated connection signal is not detected by the connection detector.

2. The apparatus of claim 1, wherein the LAN controller transmits a second connection signal to the external dongle for connection with the external dongle when the power is supplied by the power controller to the LAN controller.

3. The apparatus of claim 2, wherein the second connection signal is transmitted after the first generated connection signal is received from the signal transformer of the external dongle.

4. The apparatus of claim 1, wherein the power controller comprises a metal-oxide semiconductor field-effect transistor (MOSFET) to perform a switching operation according to the low signal or the high signal.

5. The apparatus of claim 1, wherein the communication interface is a medium dependent interface (MDI) port.

6. The apparatus of claim 1, wherein the first generated connection signal is an MDI signal.

7. A method of controlling power of an electronic device, the method comprising:

detecting, by a connection detector, a first connection signal generated by a signal transformer of an external dongle for connecting with a LAN controller of the electronic device;

controlling, by the connection detector, supply of power to the LAN controller in response to the detecting of the first generated connection signal transmitted by the signal transformer of the external dongle and shut off of power to the LAN controller in response to not detecting the first generated connection signal, the controlling by the connection detector includes
transmitting a low signal to a power controller to supply power to the LAN controller when the first generated connection signal transmitted by the signal transformer of the external dongle is detected by the connection detector, and
transmitting a high signal to the power controller to shut off power to the LAN controller when the first generated connection signal is not detected by the connection detector.

8. The method of claim 7, further comprising:
when power is supplied to the LAN controller, transmitting, by the LAN controller, a second connection signal to the external dongle for connection with the external dongle.

9. The method of claim 8, wherein the second connection signal is transmitted after the first generated connection signal is received from the signal transformer of the external dongle.

10. The method of claim 7, wherein the shutting-off power comprises shutting-off power by using a MOSFET to perform a switching operation according to the low signal or the high signal.

11. The method of claim 7, wherein the communication interface is an MDI port.

12. The method of claim 7, wherein the first generated connection signal is an MDI signal.

13. A non-transitory computer readable medium for an electronic device having recorded thereon a program which when executed by the electronic device performs:
detecting a connection signal generated by a signal transformer of an external dongle for connecting with a LAN controller of the electronic device;
controlling supply of power to the LAN controller in response to the detecting of the generated connection signal transmitted by the signal transformer of the external dongle and shut off of power to the LAN controller in response to not detecting the generated connection signal,
the controlling of the supply of power to the LAN controller includes
transmitting a low signal to a power controller to supply power to the LAN controller when the generated connection signal transmitted by the signal transformer of the external dongle is detected, and
transmitting a high signal to the power controller to shut off power to the LAN controller when the generated connection signal is not detected.

14. An apparatus to control power of an electronic device, the apparatus comprising:
a local area network (LAN) controller to control network communication of the electronic device;
a communication interface connected to the LAN controller,
wherein
the communication interface is connectable to an external dongle which performs the network communication with the LAN controller through the external dongle;
a connection detector connected to a connection pin of the communication interface to detect connection of the external dongle with the communication interface, and to output a high signal or a low signal,
wherein
the connection pin of the communication interface is connected to a grounded connection pin among connection pins of the external dongle;
a voltage source connected between the connection pin of the communication interface which is connected to the grounded connection pin of the external dongle and the connection detector to thereby apply a voltage detectable according to the voltage of the grounded pin of the external dongle; and
a power controller to shut off power to the LAN controller when the high signal is output and to supply power to the LAN controller when the low signal is output,
wherein
the connection detector outputs the high signal when a voltage applied by the voltage source is detected due to the grounded connection pin of the external dongle not being connected to the communication interface and outputs the low signal when the voltage applied by the voltage source is not detected due to the grounded connection pin of the external dongle being connected to the communication interface.

15. An apparatus to control power of an electronic device, the apparatus comprising:
a local area network (LAN) controller to control network communication of the electronic device;
a communication interface connected to the LAN controller,
wherein
the communication interface is connectable to an external dongle which performs the network communication with the LAN controller through the external dongle, the external dongle includes a signal transformer which generates a connection signal and a LAN port connectable to a LAN connector;
a connection detector to detect, in response to the external dongle connected to the communication interface, at least one of a link pulse signal transmitted through the signal transformer of the external dongle or a generated connection signal transmitted by the signal transformer of the external dongle; and
a power controller to supply power to the LAN controller in response to a detection by the connection detector of the at least one of the link pulse signal or the generated connection signal and to shut off power to the LAN controller in response to not detecting by the connection detector the at least one of the link pulse signal or the generated connection signal,
to thereby by the power control supply and shut off power to the LAN controller in response to the detection or the not detection by the connection detector of the at least one of the link pulse signal or the generated connection signal,
wherein the connection detector transmits a low signal to the power controller when the generated connection signal transmitted by the signal transformer of the external dongle is detected by the connection detector and transmits a high signal to the power controller when the generated connection signal is not detected by the connection detector.

16. An apparatus to control power of an electronic device, the apparatus comprising:
a local area network (LAN) controller to control network communication of the electronic device;
a communication interface connected to the LAN controller,
wherein
the communication interface is connectable to an external dongle which performs the network communication with the LAN controller through the external dongle, the external dongle includes a signal transformer which generates a connection signal;
a connection detector to detect an impedance change of the communication interface due to the generated connection signal while the external dongle is connected to the communication interface; and
a power controller to supply power to the LAN controller in response to the connection detector detecting the external dongle is connected to the communication interface and to shut off power to the LAN controller in response to the connection detector detecting the external dongle is not connected to the communication interface,
wherein the connection detector transmits a low signal to the power controller when the impedance change due to the generated connection signal transmitted by the signal transformer of the external dongle is detected by the connection detector and transmits a high signal to the power controller when the impedance change due to the generated connection signal is not detected by the connection detector.

17. An apparatus to control power of an electronic device, the apparatus comprising:
a local area network (LAN) controller to control network communication of the electronic device;
a communication interface connected to the LAN controller,
wherein
the communication interface is connectable to an external dongle to perform the network communication with the LAN controller through the external dongle, the external dongle includes a signal transformer and a LAN port connectable to a LAN connector;
a connection detector to detect a characteristic of a connection between the communication interface and the signal transformer of the external dongle; and
a power controller to control power to be supplied to the LAN controller according to the detected characteristic,
wherein
the characteristic of the connection comprises at least one of
existence of a connection signal generated and transmitted by the signal transformer of the external dongle to the communication interface,
a voltage level of a signal between the external dongle and the communication interface,
existence of a link pulse signal transmitted through the signal transformer of the external dongle to the communication interface, and
a change of an impedance level between the communication interface and the signal transformer of the external dongle due to the generated connection signal by the signal transformer of the external dongle,
the connection detector transmits a low signal to the power controller when the characteristic of the connection to the external dongle is detected by the connection detector and transmits a high signal to the power controller when the characteristic of the connection to the external dongle is not detected by the connection detector.

18. The apparatus of claim 17, further comprising:
a main controller to generate a control signal to control a power supplier and the power controller to supply the power to the LAN controller according to the control signal to initiate a communication with the external dongle after the power controller terminates the power supply to the LAN controller.

19. The apparatus of claim 17, wherein the power controller repeats a power supply operation and a power shut off operation on the LAN controller according to at least one of the detected characteristic and a communication initiation signal to initiate the network communication.

20. The apparatus of claim 17, wherein the LAN controller is in one of a wake up state and a sleep state according to the power supplied to the LAN controller.

* * * * *